(12) United States Patent
Matsumoto

(10) Patent No.: US 8,599,295 B2
(45) Date of Patent: Dec. 3, 2013

(54) IMAGING ELEMENT AND IMAGING DEVICE WITH CONSTANT CURRENT SOURCE GATE-TO-SOURCE POTENTIAL DIFFERENCE

(75) Inventor: Shizunori Matsumoto, Kanagawa (JP)

(73) Assignee: Sony Corporation (JP)

( * ) Notice: Subject to any disclaimer, the term of this patent is extended or adjusted under 35 U.S.C. 154(b) by 260 days.

(21) Appl. No.: 13/110,125

(22) Filed: May 18, 2011

(65) Prior Publication Data

US 2011/0317056 A1 Dec. 29, 2011

(30) Foreign Application Priority Data

Jun. 23, 2010 (JP) .................................. 2010-142679

(51) Int. Cl.
*H04N 3/14* (2006.01)
*H04N 5/335* (2011.01)

(52) U.S. Cl.
USPC .......................................... 348/308; 348/241

(58) Field of Classification Search
USPC ................................................... 348/241, 308
See application file for complete search history.

(56) References Cited

U.S. PATENT DOCUMENTS

| | | | |
|---|---|---|---|
| 6,697,108 B1 * | 2/2004 | Chen et al. | 348/241 |
| 2005/0253942 A1 | 11/2005 | Muramatsu et al. | |
| 2008/0170147 A1 * | 7/2008 | Barbier et al. | 348/308 |
| 2009/0166547 A1 * | 7/2009 | Endo et al. | 250/370.14 |
| 2010/0245647 A1 * | 9/2010 | Honda et al. | 348/308 |

FOREIGN PATENT DOCUMENTS

| | | |
|---|---|---|
| JP | 2005-311487 | 11/2005 |
| JP | 2005-328135 | 11/2005 |

* cited by examiner

*Primary Examiner* — Gevell Selby
(74) *Attorney, Agent, or Firm* — Sheridan Ross P.C.

(57) ABSTRACT

Disclosed herein is an imaging element including a pixel array section, a first current source, a first ground line, a first switch, a first capacitive element, a second switch, and a current control circuit.

6 Claims, 12 Drawing Sheets

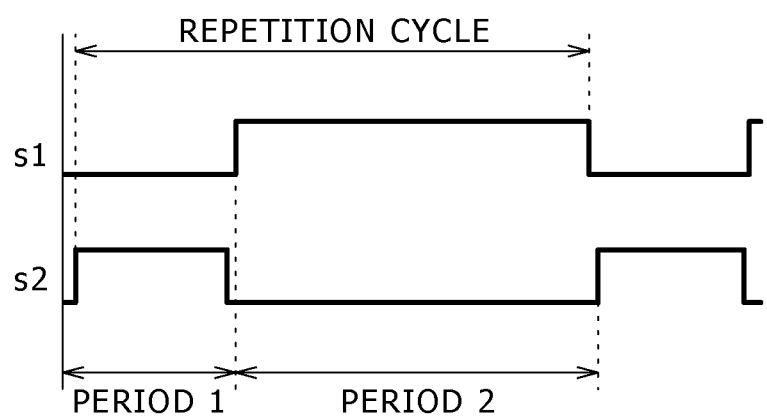
F I G . 2

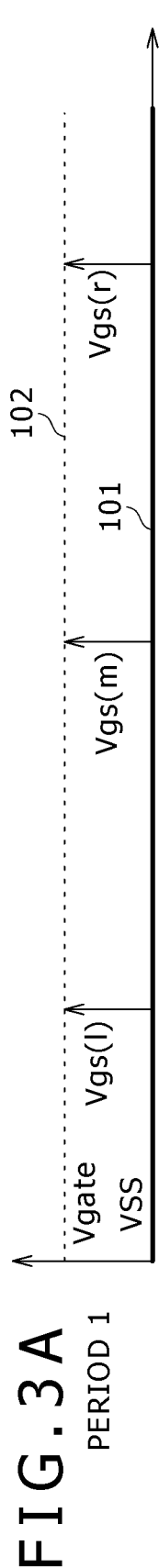
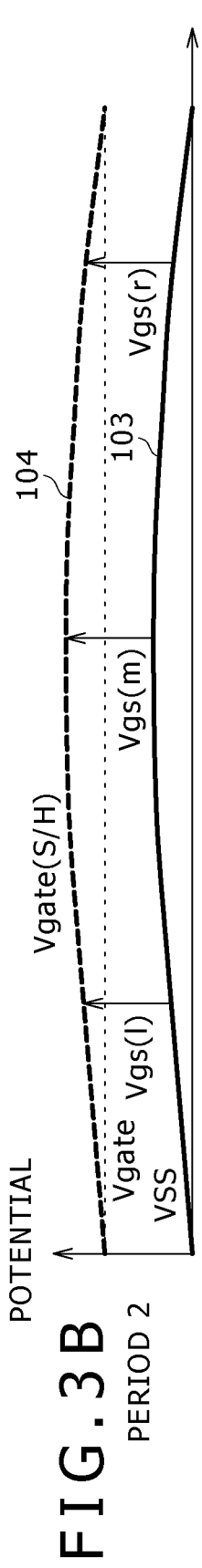
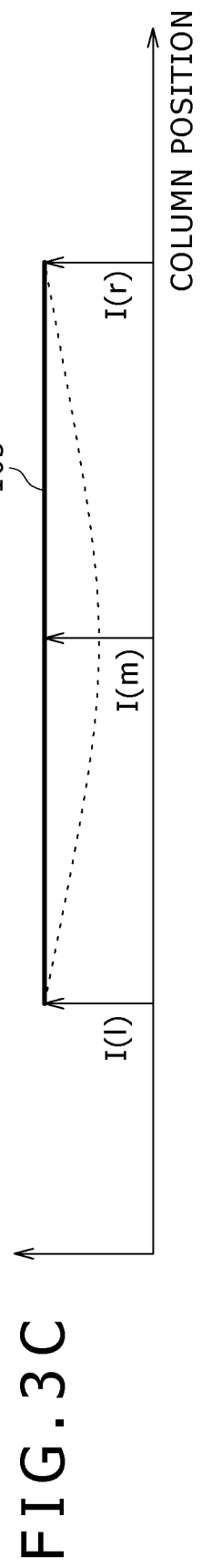

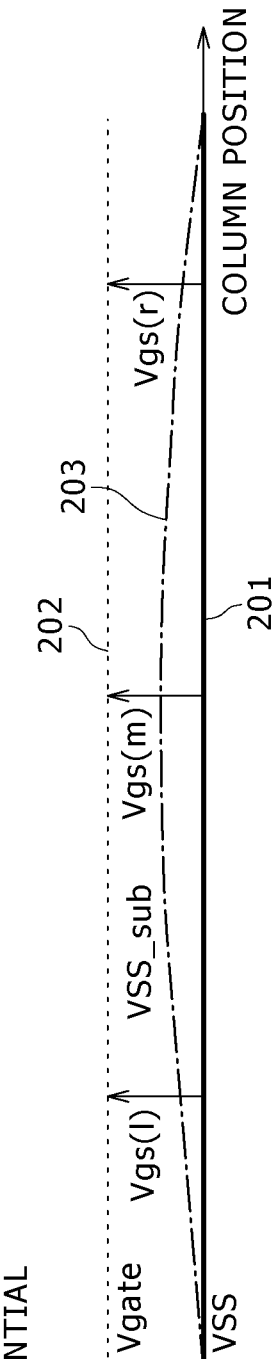
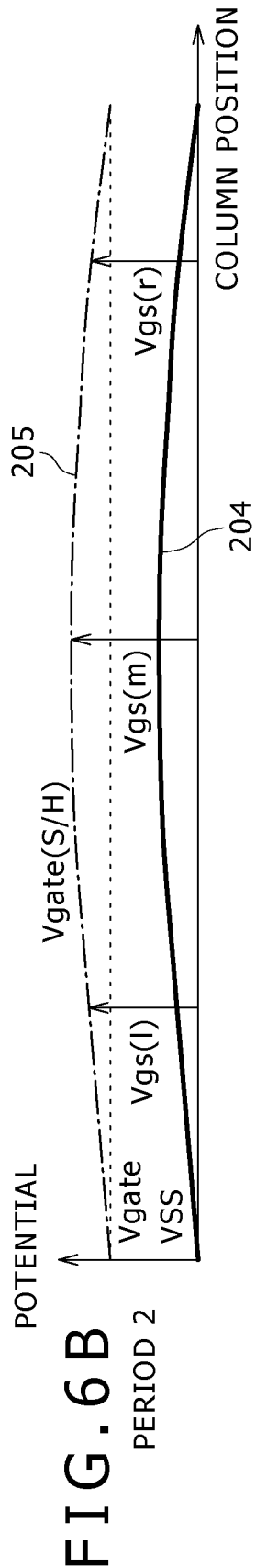
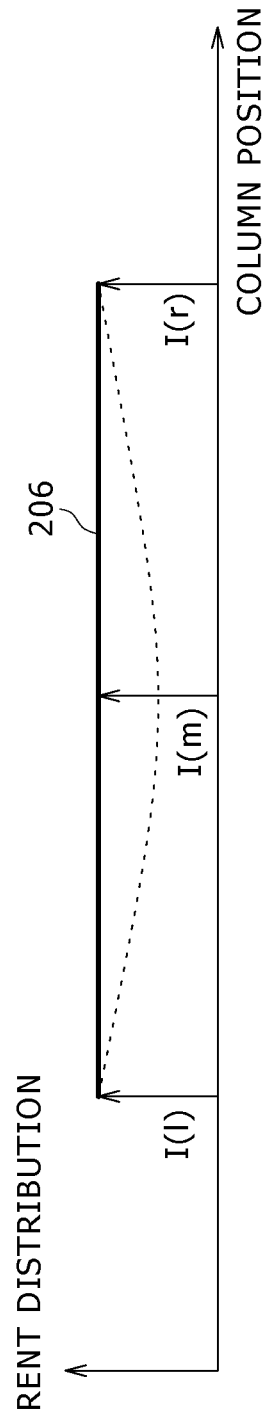
FIG. 6A PERIOD 1
FIG. 6B PERIOD 2
FIG. 6C

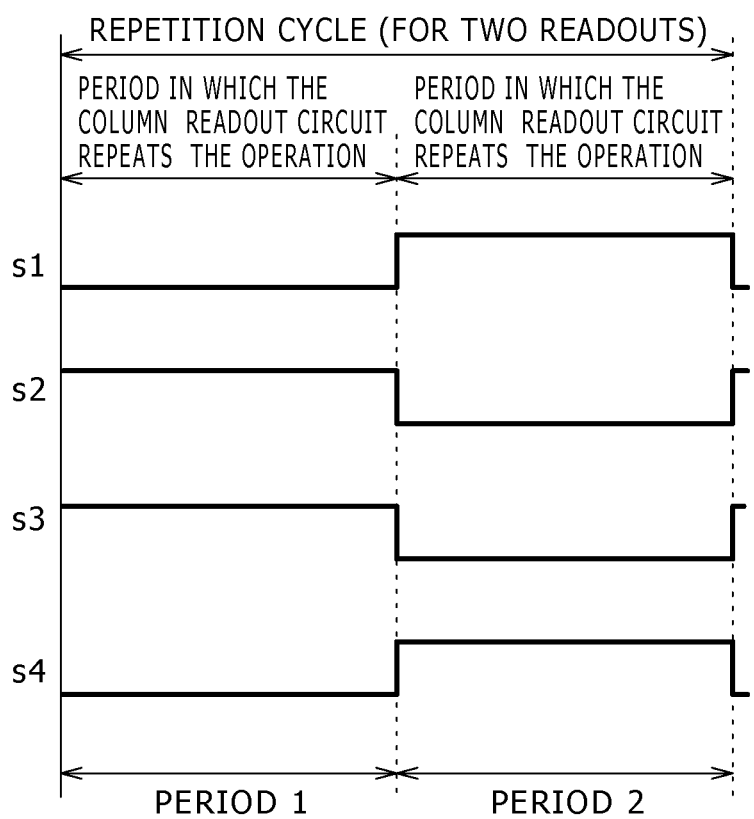

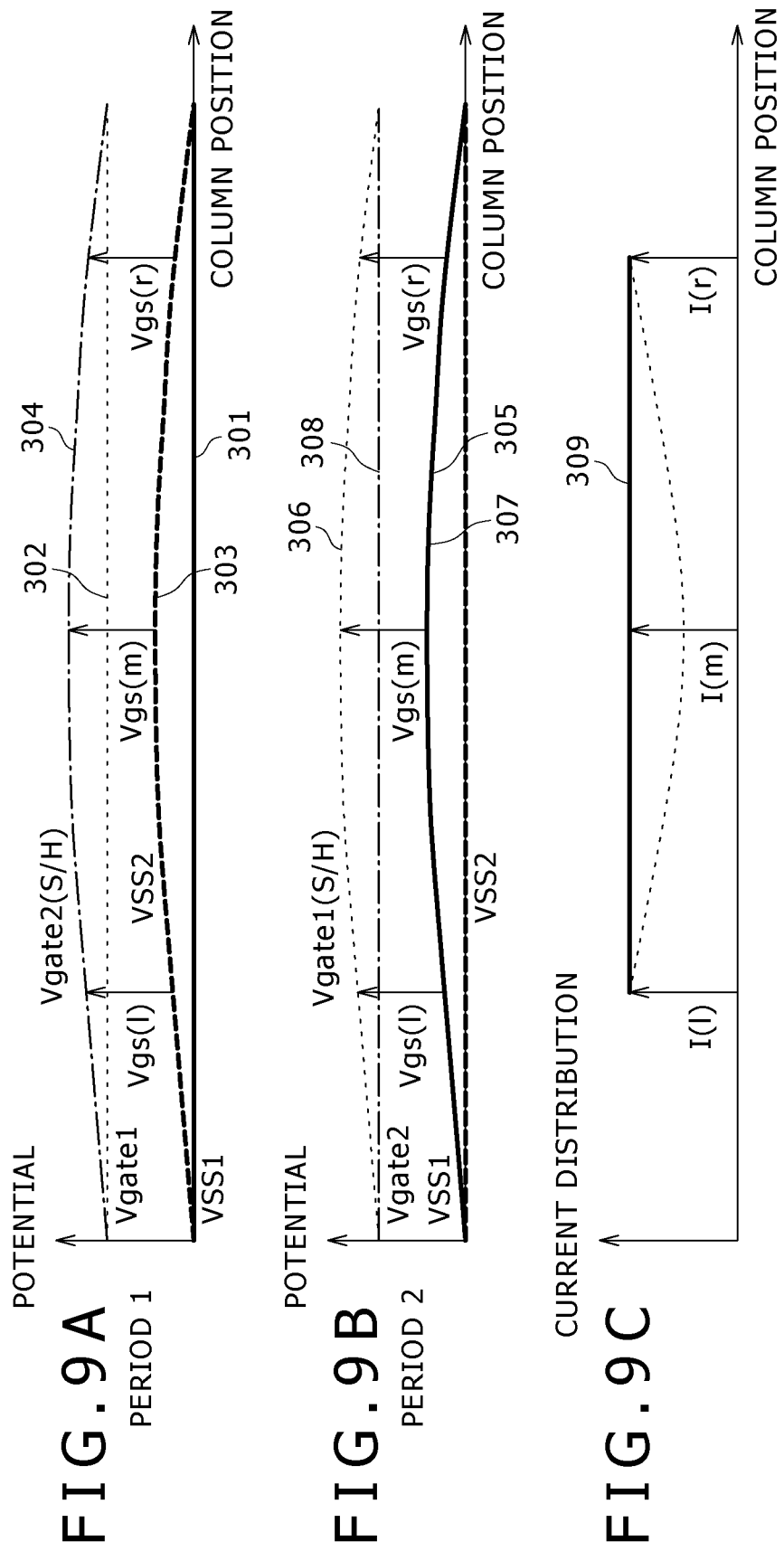

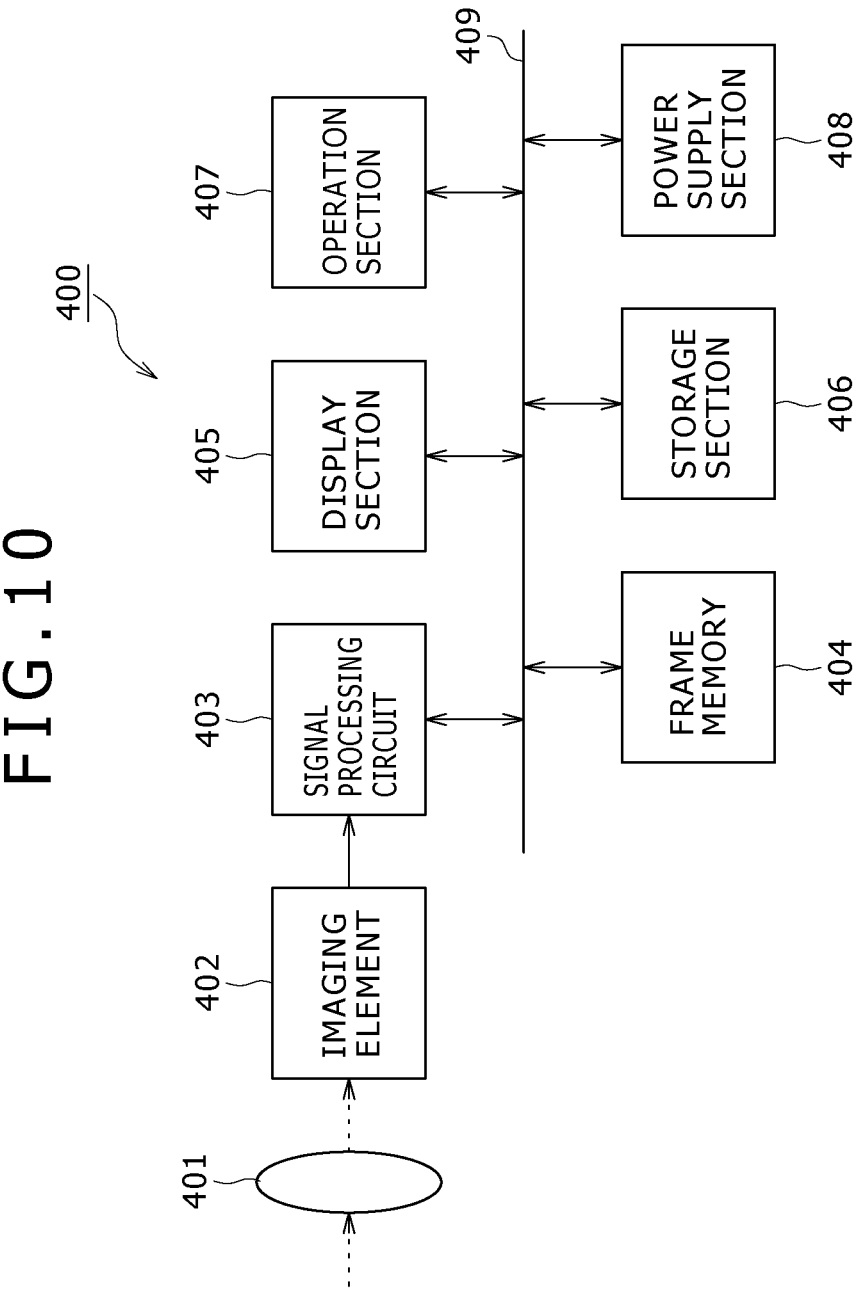

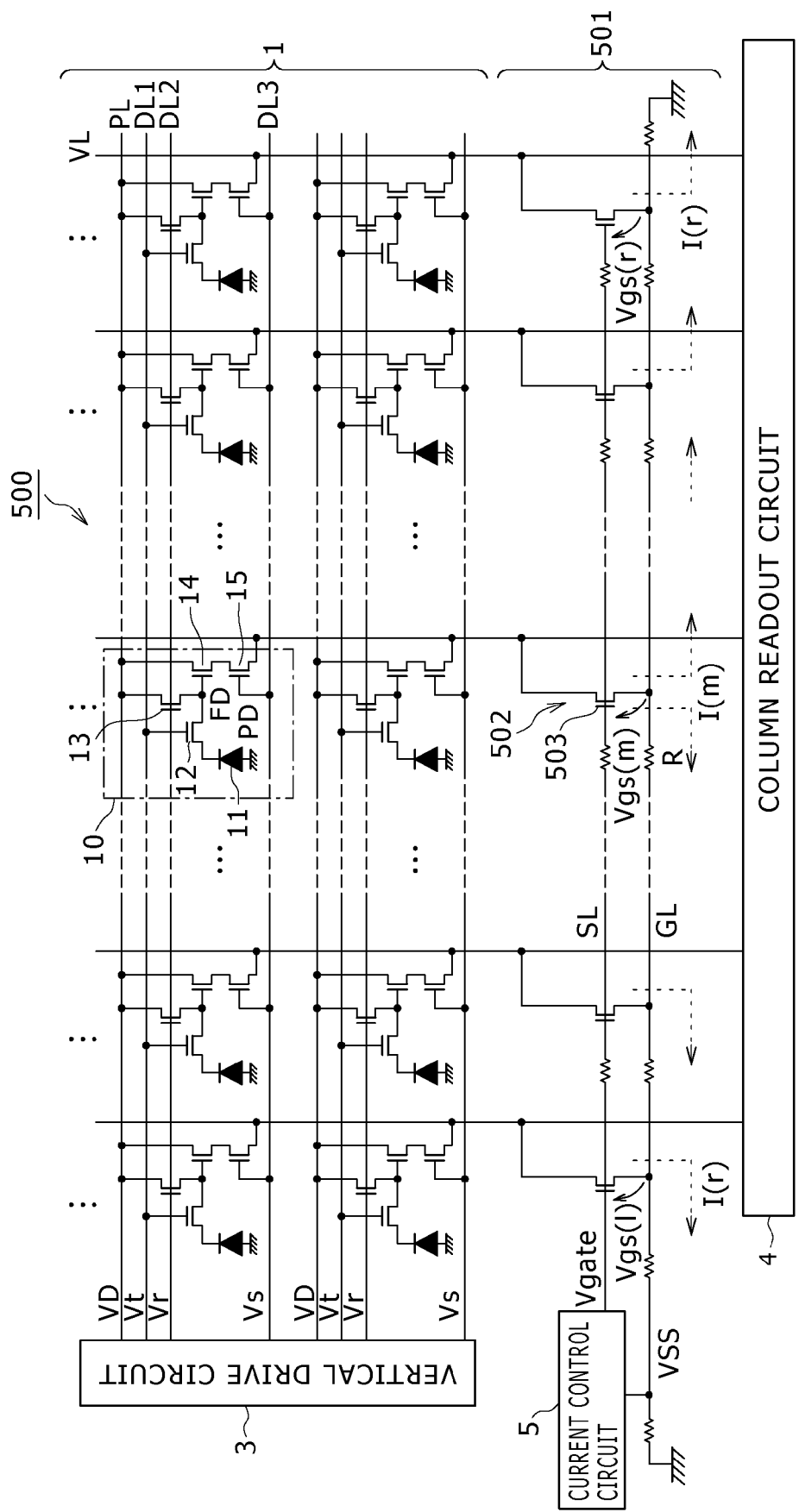

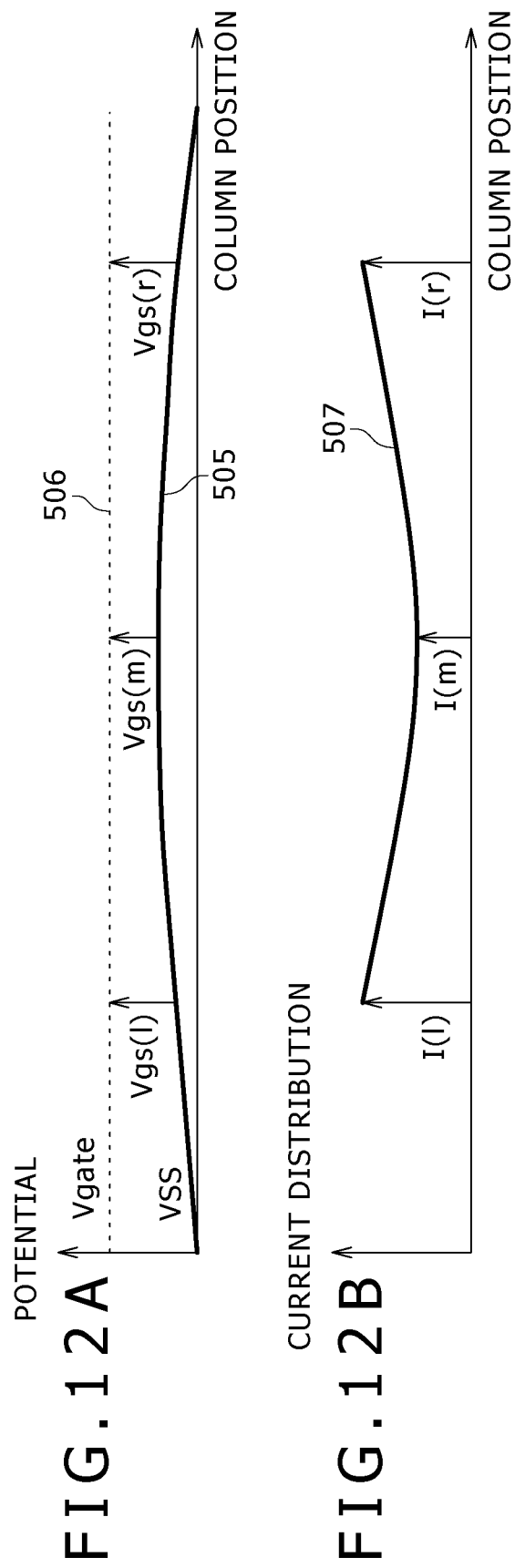

IMAGING ELEMENT AND IMAGING DEVICE WITH CONSTANT CURRENT SOURCE GATE-TO-SOURCE POTENTIAL DIFFERENCE

BACKGROUND

The present disclosure relates to an imaging element and imaging device, and more particularly, to a column readout solid-state imaging element and an imaging device having the same.

In recent years, fast readout techniques have become important as a result of increased number of pixels and higher frame rate in a solid-state imaging element adapted to convert light admitted, for example, into a digital camera into an electric signal and output the converted image signal. Among such solid-state imaging elements capable of fast readout is MOS (Metal Oxide Semiconductor) image sensor (refer, for example, to Japanese Patent Laid-Open Nos. 2005-328135 and 2005-311487).

MOS image sensors can be manufactured by a process similar to that for CMOS (Complementary Metal Oxide Semiconductor) integrated circuits. As a result, analog circuitry adapted to convert electric charge into an electric signal for each pixel and process the converted electric signal for each column can be mixed with logic and other circuitry in the same chip in a MOS image sensor. The MOS image sensor manufactured in this manner is capable of processing electric signals, each read out from one of the columns, in parallel, thus providing improved readout speed.

FIG. 11 illustrates the schematic configuration of a traditional column readout solid-state imaging element (image sensor) described, for example, in Japanese Patent Laid-Open Nos. 2005-328135 and 2005-311487. A solid-state imaging element 500 includes a pixel array section 1 and current source circuit section 501. The pixel array section 1 has a plurality of pixels 10 arranged in a matrix form. The current source circuit section 501 controls the readout operation adapted to read out an electric signal from each of the pixels 10. It should be noted that the current source circuit section 501 includes a plurality of current source circuits 502 and is provided one for each column. The solid-state imaging element 500 further includes a vertical drive circuit 3, column readout circuit 4 and current control circuit 5. The current control circuit 5 controls the operation of the current source circuit section 501.

Each of the current source circuits 502 normally includes a single stage of a MOSFET (MOS Field-Effect Transistor) 503 (hereinafter referred to as the current source 503). It should be noted that an example is shown in FIG. 11 in which an NMOS transistor (Negative channel Metal Oxide Semiconductor) transistor adapted to draw a current is used as the current source 503. It should be noted that the current flowing through the current source circuit 502, i.e., the current flowing from the drain electrode to the source electrode of the current source 503, is determined by a potential difference Vgs between the potentials of the gate electrode and source electrode of the current source 503. It should be noted that the gate, source and drain electrodes of a MOS transistor will be hereinafter simply referred to as the gate, source and drain of the MOS transistor.

A gate potential Vgate of each of the current sources 503 is supplied via a gate potential supply line SL provided in common for the current source circuits 502. In the example shown in FIG. 11, the gate potential Vgate is supplied from the current control circuit 5 provided at one end of the gate potential supply line SL. It should be noted that no current flows through the gate potential supply line SL. As a result, the gate potential Vgate of each of current sources 503 is constant.

A source potential VSS of each of the current sources 503 is supplied via a ground line GL provided in common for the current source circuits 502. In the example shown in FIG. 11, both ends of the ground line GL are grounded. The source potential VSS is supplied from both ends of the ground line GL. It should be noted that the ground line GL is used to feed a current I (column current), drawn from the drain to the source of each of the current sources 503, to both sides of the column.

As described above, in the traditional solid-state imaging element 500 shown in FIG. 11, a source follower circuit, made up of an amplifying transistor 14 in the pixel 10 and the current source 503 in the current source circuit 502, is provided for each column (vertical signal line VL) of the pixel array section 1. The source follower circuit transfers the pixel signal (electric signal) converted by each of the pixels 10 to the column readout circuit 4. At this time, fast processing is made possible by simultaneous readout of the pixel signals from the columns and parallel processing of these signals.

SUMMARY

As described above, fast processing is made possible by simultaneous readout of the pixel signals from the columns and parallel processing of these signals in the solid-state imaging element 500 shown in FIG. 11. However, such readout entails the following problem. This problem will be described more specifically below with reference to FIGS. 12A and 12B. It should be noted that FIG. 12A is a potential distribution diagram illustrating the relationship between the column position on the ground line GL and the gate potential Vgate and source potential VSS of each of the current sources 503 during readout of a pixel signal (electric signal). On the other hand, FIG. 12B is a current distribution diagram illustrating the relationship between the column position on the ground line GL and the column current I flowing out from each of the current sources 503.

It should be noted that reference numerals Vgs(m) and I(m) in FIGS. 11, 12A and 12B represent the gate-to-source potential difference Vgs of the current source 503 located at the center in the direction of extension of the ground line GL and the column current I supplied from this current source 503, respectively. Further, reference numerals Vgs(r) and I(r) represent the gate-to-source potential difference Vgs of the current source 503 located near the right end of the ground line GL and the column current I supplied from this current source 503, respectively. Still further, reference numerals Vgs(l) and I(l) represent the gate-to-source potential difference Vgs of the current source 503 located near the left end of the ground line GL and the column current I supplied from this current source 503, respectively.

In the solid-state imaging element 500 shown in FIG. 11, the column current I flowing out from each of the current source circuits 502 flows into both sides of the ground line GL. At this time, voltage drop (hereinafter referred to as an IR drop) occurs in the ground line GL due to a wire resistance R of the same line GL, thus changing the source potential VSS of each of the current sources 503 according to the position of this current source 503 (column position).

More specifically, the source potential VSS of the current source 503 peaks near the center of the ground line GL and decreases progressively toward both sides. That is, the source potential VSS supplied to the current source 503 located near the center of the ground line GL floats relative to the source potentials VSS supplied to the current sources 503 located at the ends of the ground line GL.

On the other hand, the gate potential Vgate is supplied to the gate of the current source 503 via the gate potential supply line SL. However, no current flows through the gate potential supply line SL. Therefore, the gate potential Vgate of all the current sources 503 is constant irrespective of the column position on the ground line GL as illustrated by a characteristic curve 506 in FIG. 12A.

As a result, the gate-to-source potential difference Vgs of the current source 503 in each of the current source circuits 502 is the lowest near the center of the ground line GL. Therefore, the current I determined by the gate-to-source potential difference Vgs of the current source 503 in each of the current source circuits 502 is the lowest near the center of the ground line GL and increases progressively toward both sides as illustrated by a characteristic curve 507 in FIG. 12B.

If the column current I near the center of the ground line GL is lower than those on both sides due to IR drop, the operating margin during readout near the center of the ground line GL is lower than those on both sides. This leads to degraded readout accuracy of the column readout circuit 4.

A possible solution to the above problem of IR drop would be to reinforce the ground line GL. The ground line GL may be reinforced, for example, by thickening the same line GL or grounding the same line GL at a plurality of locations along its route via lead wires. However, these techniques lead to a larger layout size of the ground line GL. If there are constraints in chip size, the area in which the ground line GL can be formed in the chip is limited. Therefore, even if the ground line GL is reinforced, it may not be possible to fully minimize the impact of IR drop.

Another possible solution to the problem of IR drop would be to increase the amount of current flowing into each of the current source circuits 502 in consideration of IR drop in the ground line GL so as to secure an operating margin near the center of the ground line GL. However, such an approach designed to provide the current source 503 with a settling margin results in consumption of unnecessary power at the ends of the ground line GL where a sufficient operating margin can be obtained thanks to a small IR drop.

Further, recent years have seen an increase in the number of columns with increase in the number of pixels, making it difficult to minimize the above IR drop.

In light of the foregoing, it is desirable to provide an imaging element and imaging device capable of resolving the problem of IR drop, minimizing the increase in layout size and ensuring reduced power consumption.

According to the embodiments of the present disclosure, there is provided an imaging element. The imaging element includes a pixel array section, first current source, first ground line, first switch, first capacitive element, second switch and current control circuit. Each of the sections is configured and functions in the following manner. The pixel array section has a plurality of pixels arranged in a matrix form along the row and column directions and a plurality of readout signal lines adapted to read out pixel signals from the plurality of pixels. The first current source includes a MOS transistor and is provided for each readout signal line. The first ground line is supplied with a current generated by the first current source. The first switch is provided between the drain of the first current source and the associated readout signal line to turn ON and OFF so as to control the current flowing through the first current source. The first capacitive element is provided between the gate and source of the first current source to raise the gate potential of the first current source to a predetermined level and/or hold the gate potential at this level. The second switch starts and stops the charging of the first capacitive element. The current control circuit switches OFF the first switch and switches ON the second switch during a first period in which the first capacitive element is charged. The current control circuit switches ON the first switch and switches OFF the second switch during a second period in which pixel signals are read out.

According to the embodiments of the present disclosure, there is also provided an imaging device. The imaging device includes the pixel array section of the imaging element according to the present disclosure, optics and current source circuit section. The optics captures subject light and forms an image on the imaging surface of the pixel array section. The current source circuit section includes the first current source, first ground line, first switch, first capacitive element, second switch and current control circuit of the imaging element according to the present disclosure.

In the embodiments of the present disclosure, the current flowing from the first current source to the ground line is interrupted during the first period, thus raising the gate potential of the first current source to a predetermined level and/or holding the gate potential at this level. A current is allowed to flow from the first current source to the ground line during the second period. During the second period, therefore, an IR drop occurs in the ground line as in the past, thus changing the source potential of the first current source according to the position on the ground line. In the present disclosure, however, the gate of the first current source floats during the second period. Therefore, the gate potential changes according to the position on the ground line as does the source potential, thus canceling out the impact of the IR drop. As a result, the gate-to-source potential difference of the first current source is constant irrespective of the position on the ground line during the second period, i.e., a pixel signal readout period. The current flowing from the first current source to the ground line is also constant irrespective of the position on the ground line.

As described above, in the present disclosure, the column current flowing from the first current source to the ground line is constant irrespective of the position on the ground line during the second period, i.e., a pixel signal readout period. This makes it possible for the present disclosure to resolve the above problem of IR drop.

Further, the present disclosure can cancel out the impact of IR drop even in the event of IR drop in the ground line. Therefore, the present disclosure eliminates the need to consider the impact of IR drop during design of ground line layout, thus providing a higher degree of freedom in designing the ground line layout and ensuring smaller layout size.

Still further, the present disclosure eliminates the need to cause an unnecessary column current to flow to the current source circuit in consideration of the impact of IR drop as has been done in the past, thus ensuring reduced power consumption.

BRIEF DESCRIPTION OF THE DRAWINGS

FIG. 2 is timing diagrams of a readout operation in the solid-state imaging element according to the first embodiment of the present disclosure;

FIGS. 3A to 3C are voltage distribution diagrams illustrating the relationship between the column position on a ground line and gate and source potentials of a current source and a current distribution diagram illustrating the relationship between the column position and column current in the solid-state imaging element according to the first embodiment of the present disclosure;

FIGS. 6A to 6C are voltage distribution diagrams illustrating the relationship between the column position on the ground line and the gate and source potentials of the current source and a current distribution diagram illustrating the relationship between the column position and column current in the solid-state imaging element according to the second embodiment of the present disclosure;

FIG. 8 is a timing diagram of the readout operation in the solid-state imaging element according to the third embodiment of the present disclosure;

FIGS. 9A to 9C are voltage distribution diagrams illustrating the relationship between the column position on the ground line and the gate and source potentials of the current source and a current distribution diagram illustrating the relationship between the column position and column current in the solid-state imaging element according to the third embodiment of the present disclosure;

FIG. 10 is a schematic configuration block diagram of an imaging device using the imaging element of the embodiments of the present disclosure;

FIG. 11 is a schematic configuration diagram of a traditional solid-state imaging element; and FIGS. 12A and 12B are, respectively, a voltage distribution diagram illustrating the relationship between the column position on the ground line and the gate and source potentials of the current source and a current distribution diagram illustrating the relationship between the column position and column current in the traditional solid-state imaging element.

DETAILED DESCRIPTION OF THE PREFERRED EMBODIMENTS

A description will be given below of configuration examples of the imaging element according to the present disclosure and the imaging device having the same in the following order with reference to the accompanying drawings. It should be understood that the present disclosure is not limited to these examples.
1. First embodiment (basic configuration example of the solid-state imaging element)
2. Second embodiment
3. Third embodiment
4. Various modification examples
5. Fourth embodiment (configuration example of the imaging device)

1. First Embodiment

Basic Configuration Example of the Solid-State Imaging Element

[Overall Configuration of the Solid-State Imaging Device]

Figure 1:
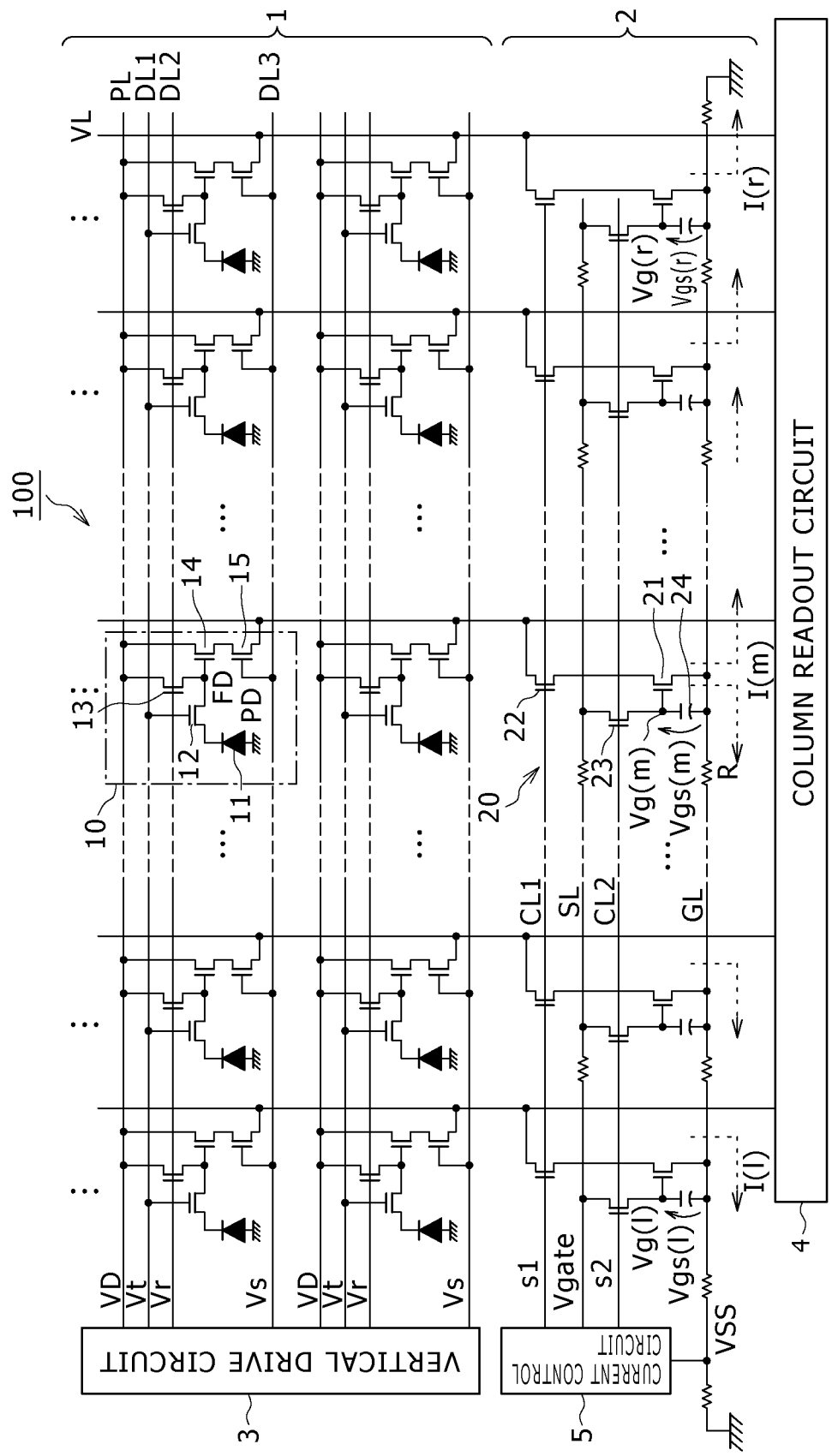
FIG. 1 is a schematic configuration diagram of a solid-state imaging element according to a first embodiment of the present disclosure.

FIG. 1 illustrates the schematic configuration of a column readout image sensor (solid-state imaging element) according to a first embodiment.

A solid-state imaging element 100 (imaging element) includes the pixel array section 1, a current source circuit section 2, a vertical drive section 3, a column readout circuit 4 (readout circuit) and the current control circuit 5. These sections are formed on the same semiconductor substrate (chip) which is not shown.

The pixel array section 1 has the plurality of pixels 10 arranged in a matrix form along the row (horizontal in FIG. 1) and column (vertical in FIG. 1) directions. It should be noted that the specific configuration of the pixel 10 (unit pixel) will be described later.

Further, a power supply line PL and a plurality of pixel drive lines (DL1 to DL3 in FIG. 1) are formed for each row along the row direction in the pixel array section 1 for the pixels 10 arranged in a matrix form. The power supply line PL supplies a power source potential VD. The pixel drive lines each supply a drive signal (Vt, Vr and Vs in FIG. 1). Each of the wires has one of its ends connected to the associated output terminal of the vertical drive circuit 3. Still further, a vertical signal line VL (readout signal line) is formed for each column along the column direction in the pixel array section 1 for the pixels 10 arranged in a matrix form. Each of the wires has one of its ends connected to the associated output terminal of the column readout circuit 4. The signal (analog electric signal) output from one of the pixels 10, scanned and selected by the vertical drive circuit 3, is supplied to the column readout circuit 4 via the associated vertical signal line VL.

The current source circuit section 2 includes a plurality of current source circuits 20 that are provided one for each of the vertical signal lines VL. The current source circuit section 2 maintains the current constant during readout of an electric signal from each of the pixels 10. It should be noted that the specific configuration of the current source circuit 20 will be described later.

On the other hand, an example has been described in FIG. 1 in which the current source circuit 20 is provided for each column for the pixels 10 arranged in a matrix form. However, the present disclosure is not limited thereto. If the single vertical signal line VL is shared among a plurality of rows of pixels, the current source circuit 20 is provided for each of the vertical signal lines VL shared among the plurality of rows of pixels.

The vertical drive circuit 3 has a circuit (not shown) that includes, for example, a shift register or address decoder to select and scan, sequentially for each row, the pixels 10 from which signals are to be read out. The vertical drive circuit 3 also has a circuit (not shown) adapted to supply a variety of drive signals (Vt, Vr and Vs in FIG. 1) to the pixels 10 in the row scanned for readout.

The column readout circuit 4 has AD (Analog to Digital) converters (not shown) adapted to read out analog electric signals from the pixels 10 in the row selected and scanned by the vertical drive circuit 3 and convert the analog signals into digital signals. The column readout circuit 4 also has selection circuits (not shown) each of which includes, for example, a shift register or address decoder to sequentially select and scan the AD converter in one of the columns.

The current control circuit 5 controls the operation of the current source circuit section 2 and supplies a variety of drive signals (s1, s2 and Vgate in FIG. 1) to the current source circuit section 2 during readout operation.

[Pixel Configuration]

Each of the pixels 10 includes a photoelectric conversion element 11, transfer transistor 12, reset transistor 13, amplifying transistor 14 and selection transistor 15 as illustrated in FIG. 1. It should be noted that although, in the present embodiment, all the four transistors making up the pixel 10 are shown as N-type MOS transistors, the present disclosure is not limited thereto. The conductivity type (N- or P-type) of each of the transistors and the combination thereof may be changed as appropriate.

The power supply line PL is provided in common for the plurality of pixels 10 in the same row to supply the power source potential VD to the drains of the reset transistor 13 and amplifying transistor 14. Further, a transfer line DL1 is provided in common for the plurality of pixels 10 in the same row to supply the transfer pulse Vt to the gate of the transfer transistor 12. Still further, a reset line DL2 is provided in common for the plurality of pixels 10 in the same row to supply the reset pulse Vr to the gate of the reset transistor 13. Still further, a selection line DL3 is provided in common for the plurality of pixels 10 in the same row to supply the selection pulse Vs to the gate of the selection transistor 15.

The photoelectric conversion element 11 includes, for example, a photodiode PD to convert received light into photoelectric charge (photoelectrons in this case) having an amount of charge commensurate with the light intensity. On the other hand, the anode electrode of the photodiode PD is connected to the negative power supply (e.g., ground). The cathode electrode thereof is electrically connected to the gate of the amplifying transistor 14 via the transfer transistor 12. It should be noted that the node at which the cathode electrode of the photodiode PD and the gate of the amplifying transistor 14 are electrically connected will be hereinafter referred to as the FD (floating diffusion) section in the description given below.

The transfer transistor 12 is provided between the cathode electrode of the photodiode PD and the FD section and has its gate connected to the associated transfer line DL1. The transfer transistor 12 turns ON when the high level transfer pulse Vt is applied to its gate via the transfer line DL1, thus transferring the photoelectric charge, obtained as a result of photoelectric conversion by the photodiode PD, to the FD section.

The reset transistor 13 is provided between the FD section and power supply line PL and has its drain connected to the power supply line PL, its source connected to the FD section and its gate connected to the associated reset line DL2. The reset transistor 13 turns ON when the high level reset pulse Vr is applied to its gate via the reset line DL2. This operation is performed prior to the transfer of signal charge from the photodiode PD to the FD section. As a result of this operation, the charge of the FD section is disposed of into the power supply line PL, thus resetting the FD section.

The amplifying transistor 14 is provided between the power supply line PL and selection transistor 15 and has its drain connected to the power supply line PL, its source connected to the selection transistor 15 and its gate connected to the associated FD section. The amplifying transistor 14 outputs, as a reset signal (reset level), the potential of the FD section after this section is reset by the reset transistor 13. Further, the amplifying transistor 14 outputs, as a photoaccumulation signal (pixel level), the potential of the FD section after transfer of a signal charge to the FD section by the transfer transistor 12.

The selection transistor 15 is provided between the amplifying transistor 14 and vertical signal line VL and has its drain connected to the amplifying transistor 14, its source connected to the vertical signal line VL and its gate connected to the associated selection line DL3. The selection transistor 15 turns ON when the high level selection pulse Vs is applied to its gate via the selection line DL3, thus allowing for selection of the pixel 10. The selection transistor 15 relays a pixel signal, output from the amplifying transistor 14 when the pixel 10 is selected, to the vertical signal line VL. It should be noted that the location where the selection transistor 15 is provided is not limited to that in the example shown in FIG. 1. The selection transistor 15 may be provided between the power supply line PL and the drain of the amplifying transistor 14.

In the pixel 10 configured as described above, the pixel signal (voltage signal), amplified by the amplifying transistor 14, is read out, for each column, to the vertical signal line VL by the current source circuit 20 provided between the vertical signal line VL and a reference potential node (e.g., ground).

It should be noted that although an example has been described in FIG. 1 in which each of the pixels 10 includes four transistors, the present disclosure is not limited thereto. So long as the charge accumulated in the pixel 10 can be output to the vertical signal line VL provided for each column, the pixel 10 may be configured in an arbitrary manner. For example, a single transistor may serve both as the amplifying transistor 14 and selection transistor 15 so that each of the pixels 10 includes three transistors.

[Configuration of the Current Source Circuit]

Each of the current source circuits 20 includes a current source 21 (first current source), first and second switches 22 and 23 and capacitive element 24 (first capacitive element) as illustrated in FIG. 1. Further, the gate potential supply line SL and ground line GL (first ground line) are provided in common for the current source circuits 20. The gate potential supply line SL supplies the gate potential Vgate to the current source 21. The ground line GL supplies the source potential VSS to the current source 21. Still further, first and second control lines CL1 and CL2 are provided in common for the current source circuits 20. The first control line CL1 supplies a first control pulse s1 to the first switch 22. The second control line CL2 supplies a second control pulse s2 to the second switch 23.

The current source 21 includes an N-type MOS transistor. The current source 21 has its gate connected to the source of the second switch 23 and one of the electrodes of the capacitive element 24. The current source 21 has its drain connected to the source of the first switch 22 and its source connected to the ground line GL. The column current I (saturation current) flowing from the current source 21 to the ground line GL is determined by the potential difference Vgs between the gate potential Vg and source potential VSS of the current source 21.

The first switch 22 includes an N-type MOS transistor. The first switch 22 has its drain connected to the associated vertical signal line VL, its source connected to the drain of the current source 21 and its gate connected to the first control line CL1. The current supplied from the vertical signal line VL to the drain electrode of the current source 21 is controlled by the ON/OFF operation of the first switch 22. It should be noted that the first switch 22 turns ON when the high level first control pulse s1 is applied to its gate.

The second switch 23 includes an N-type MOS transistor. The second switch 23 has its drain connected to the gate potential supply line SL, its source connected to one of the electrodes of the capacitive element 24 and its gate connected to the second control line CL2. The second switch 23 turns ON when the high level second control pulse s2 is applied to its gate.

The capacitive element 24 is provided between the source of the second switch 23 and the ground line GL. The capacitive element 24 has one of its electrodes connected to the source of the second switch 23 and the gate of the current source 21 and its other electrode connected to the ground line GL. The capacitive element 24 is provided to raise or hold the gate potential of the current source 21. The charging of the capacitive element 24 is controlled by the ON/OFF operation of the second switch 23.

In the solid-state imaging element 100 configured as described above, a source follower circuit made up of the amplifying transistor 14 in the pixel 10 and current source 21 is provided for each column (vertical signal line VL) of the pixel array section 1. The source follower circuit allows for a pixel signal (electric signal), converted by each of the pixels 10, to be transferred to the column readout circuit 4.

It should be noted that although an example has been presented in FIG. 1 in which all the first and second switches 22 and 23 include an N-type MOS transistor, the present disclosure is not limited thereto. The conductivity type (N- or P-type) of each of the transistors and the combination thereof may be changed as appropriate.

[Readout Operation of the Solid-State Imaging Element]

A specific description will be given next of the readout operation of the solid-state imaging element 100 according to the present embodiment with reference to FIGS. 2 and 3A to 3C. FIG. 2 is timing diagrams of the first and second control pulses s1 and s2 supplied to each of the current source circuits 20 during readout operation. It should be noted, however, that FIG. 2 illustrates the timing diagrams during a readout period for one row (single readout period), and the repetition cycle shown in FIG. 2 corresponds to the readout period for one row.

On the other hand, FIG. 3A is a potential distribution diagram illustrating the relationship between the column position on the ground line GL and the gate and source potentials Vg and VSS of the current source 21 during a period 1 shown in FIG. 2. FIG. 3B is a potential distribution diagram illustrating the relationship between the column position on the ground line GL and the gate and source potentials Vg and VSS of the current source 21 during a period 2 shown in FIG. 2. It should be noted that the horizontal axis of the characteristic diagrams shown in FIGS. 3A and 3B represents the column position on the ground line GL, and the vertical axis thereof represents the potential. Further, FIG. 3C is a current distribution diagram illustrating the relationship between the column position on the ground line GL and the column current I supplied from the current source 21 to the ground line GL during the period 2 shown in FIG. 2. It should be noted that the horizontal axis of the characteristic diagram shown in FIG. 3C represents the column position on the ground line GL, and the vertical axis thereof represents the current level.

In the present embodiment, the readout period for one row is divided into two periods (periods 1 and 2) as illustrated in FIG. 2 so as to raise the gate potential Vg of the current source 21 and/or hold (sample and hold) the gate potential during the period 1 (first period) and read out the pixel signals during the period 2 (second period). It should be noted that the length of the period 1 is set as appropriate, for example, in consideration of various factors including the readout speed, amount of charge leaking out from the capacitive element 24 per readout and the specification of a single readout period. On the other hand, the capacitive element is not charged in the initial stage of the readout. Therefore, it is preferred that the period 1 should be set long shortly after the beginning of the readout. It should be noted that once the capacitive element 24 is charged, the amount of charge leakage is not significant from that time onward. Therefore, the period 1 may be set shorter at times other than the initial stage.

First, the current control circuit 5 supplies the low level first control pulse s1 to the first control line CL1 during the period 1 as illustrated in FIG. 2. This turns OFF the first switch 22, thus interrupting the current flowing through the current source circuit 20. Further, the current control circuit 5 supplies the high level second control pulse s2 to the second control line CL2 during the period 1. This turns ON the second switch 23, thus charging the capacitive element 24 and raising the gate potential of the current source 21 to the potential Vgate and/or holding the gate potential at this level.

The column current I does not flow from each of the current source circuits 20 to the ground line GL during the period 1. Therefore, the source potential VSS of each of the current sources 21 is constant irrespective of the column position on the ground line GL as illustrated by a characteristic curve 101 in FIG. 3A. Further, the gate potential Vg of each of the current sources 21 is constant at the potential Vgate during the period 1 irrespective of the column position on the ground line GL as illustrated by a characteristic curve 102 in FIG. 3A. As a result, the potential difference Vgs between the gate and source of each of the current sources 21 is constant irrespective of the column position on the ground line GL.

Next, when the period 2 begins following the period 1, the current control circuit 5 supplies the high level first control pulse s1 to the first control line CL1. This turns ON the first switch 22, allowing for a current to flow into the current source circuit 20. At this time, the column current determined by the potential difference Vgs between the gate and source of each of the current sources 21 flows from each of the current source circuits 20 into the gland line GL.

Further, the current control circuit 5 supplies the low level second control pulse s2 to the second control line CL2 during the period 2. This turns OFF the second switch 23, causing the gate of the current source 21 to float.

The column current I flows through the ground line GL during the period 2 as described above, thus resulting in IR drop. As a result, the distribution of the source potential VSS over the ground line GL is in the form of an arch relative to the column position (horizontal axis) during the period 2 as illustrated by a characteristic curve 103 in FIG. 3B, with the source potential VSS of the current source 21 peaking near the column at the center of the ground line GL. That is, the source potential VSS of the current source 21 near the column at the center floats relative to the source potentials VSS at the columns at the ends of the ground line GL during the period 2.

It should be noted, however, that the gate of the current source 21 floats during the period 2 as described above and that the source and gate of the current source 21 are coupled together via the capacitive element 24. In this condition, if the source potential VSS of the current source 21 changes, the gate potential Vg of the same source 21 also changes as much as the source potential VSS. More specifically, if the source potential VSS of the current source 21 increases due to IR drop, the gate potential Vg of the same source 21 also increases as much as the source potential VSS.

That is, if the source potential VSS of the current source 21 is raised near the column at the center due to IR drop during the period 2, the gate potential Vg of the same source 21 is also raised at that column. As a result, the distribution of the gate potential Vg of the current source 21 is also in the form of an arch, with the gate potential Vg peaking near the column at the center during the period 2 as illustrated by a characteristic curve 104 (Vgate(S/H)) in FIG. 3B. As a result, the potential difference Vgs between the gate and source of the current source 21 is constant irrespective of the column position on the ground line GL. The column current I flowing from each of the current sources 21 into the ground line GL is also constant as illustrated by a characteristic curve 105 in FIG. 3C. Thus, the gate of the current source 21 is caused to float during the period 2, i.e., a readout period, thus cancelling out the impact of IR drop.

As described above, the current source circuit 20 according to the present embodiment maintains the potential difference Vgs between the gate and source of the current source 21 roughly constant irrespective of the column position of the current source 21 and whether during the period 1 or 2. This makes it possible for the current source circuit 20 according to the present embodiment to maintain constant the column current I flowing into the ground line GL irrespective of the column position.

That is, the present embodiment provides a constant current source independent of the above IR drop on the ground line GL, thus making it possible to stably generate a desired column current with high accuracy irrespective of the column position. Therefore, the solid-state imaging element 100 according to the present embodiment minimizes the decline in operating margin due to IR drop on the ground line GL, thus providing improved readout accuracy of the column readout circuit 4.

Further, the present embodiment eliminates the need to cause an unnecessary current to flow to the current source circuits 20 near the ends of the ground line GL so as to resolve the problem of IR drop as in the past because the column current I flowing into the ground line GL can be maintained constant irrespective of the column position. As a result, the present embodiment contributes to reduced power consumption of the solid-state imaging element 100.

In the present embodiment, on the other hand, it is necessary to provide a space for forming new switches and capacitive element in the current source circuit 20 unlike the traditional configuration. However, the present embodiment eliminates the need to consider the impact of IR drop, thus providing, for example, a higher degree of freedom in designing the layout of the ground line GL (higher layout efficiency) than in the past. As a result, the present embodiment contributes to smaller chip size of the solid-state imaging element 100 as compared to the traditional reinforcement of the ground line GL.

It should be noted that the capacitive element 24 provided between the gate and source of the current source 21 as in the present embodiment strengthens the coupling between the gate and source of the current source 21. This ensures more effective cancellation of IR drop.

2. Second Embodiment

In the first embodiment, the column current I does not flow during the period 1. Therefore, although the first embodiment provides low power consumption, the readout operation is performed intermittently. This may lead to noise in the event of a significant variation in current during switching from the period 1 to period 2 or vice versa. Further, the potential of the vertical signal line VL may be pulled up by the amplifying transistor 14 in the pixel 10 during the period 1 in which the column current I does not flow. In this case, it takes an additional amount of time before the potential of the vertical signal line VL converges to the desired level, possibly resulting in longer pixel signal readout time. In the present embodiment, a description will be given of a configuration example designed to resolve this problem.

[Overall Configuration of the Solid-State Imaging Device]

Figure 4:
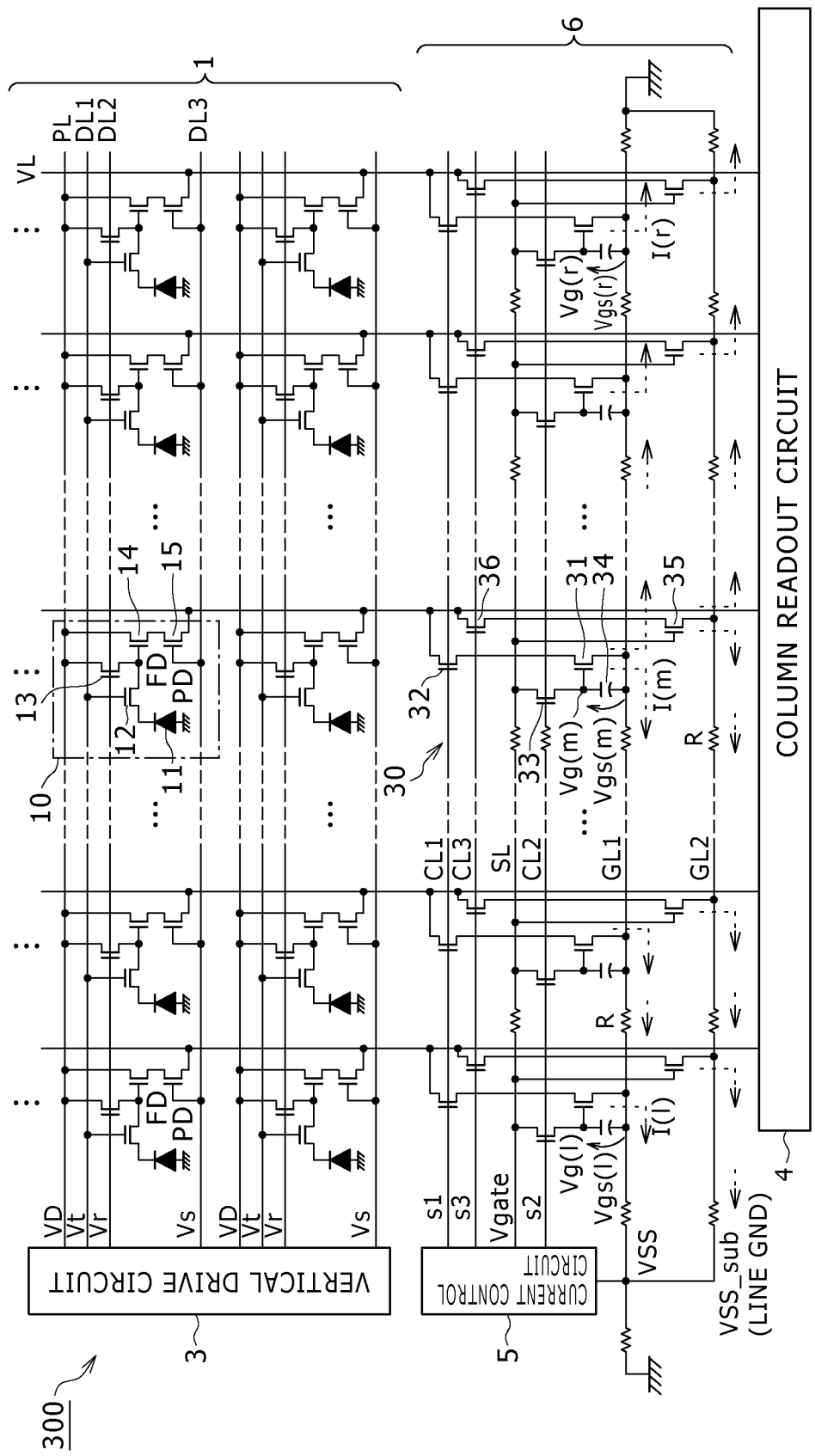
FIG. 4 is a schematic configuration diagram of the solid-state imaging element according to a second embodiment of the present disclosure.

FIG. 4 illustrates the schematic configuration of the solid-state imaging element according to the second embodiment. It should be noted that the components of a solid-state imaging element 200 according to the present embodiment shown in FIG. 4 identical to those of the solid-state imaging element 100 according to the first embodiment shown in FIG. 1 are denoted by the same reference numerals.

The solid-state imaging element 200 includes the pixel array section 1, a current source circuit section 6, the vertical drive circuit 3, the column readout circuit 4 and current control circuit 5. These sections are formed on the same semiconductor substrate (chip) which is not shown. The solid-state imaging element 200 is configured in the same manner as its counterpart according to the first embodiment except for the current source circuit section 6. Therefore, the configuration of only the current source circuit section 6 will be described here.

It should be noted that the current source circuit section 6 includes a plurality of current source circuits 30 that are provided one for each of the vertical signal line VL.

[Configuration of the Current Source Circuit]

Each of the current source circuits 30 includes a first current source 31, first and second switches 32 and 33, capacitive element 34 (first capacitive element), second current source 35 and third switch 36 as illustrated in FIG. 4.

The gate potential supply line SL is provided in common for the current source circuits 30. The gate potential supply line SL supplies the gate potential Vgate to the first and second current sources 31 and 35. Further, first and second ground lines GL1 and GL2 are provided in common for the current source circuits 30. The first ground line GL1 supplies the source potential VSS to the first current source 31. The second ground line GL2 supplies a source potential VSS_sub to the second current source 35. It should be noted that the first and second ground lines GL1 and GL2 are arranged in parallel with their both ends grounded.

Still further, the first and second control lines CL1 and CL2 are provided in common for the current source circuits 30. The first control line CL1 supplies the first control pulse s1 to the first switch 32. The second control line CL2 supplies the second control pulse s2 to the second switch 33. Still further, a third control line CL3 is provided in common for the current source circuits 30. The third control line CL3 supplies a third control pulse s3 to the third switch 36.

It should be noted that the first current source 31, first and second switches 32 and 33 and capacitive element 34 in each of the current source circuits 30 according to the present embodiment are configured in the same manner as their counterparts in each of the current source circuits 20 according to the first embodiment (FIG. 1), i.e., the current source 21, first and second switches 22 and 23 and capacitive element 24. Further, the gate potential supply line SL, first ground line GL1 and first and second control lines CL1 and CL2 according to the present embodiment are also configured in the same manner as their counterparts according to the first embodiment (FIG. 1), i.e., the gate potential supply line SL, ground line GL and first and second control lines CL1 and CL2.

That is, the current source circuit 30 according to the present embodiment includes an auxiliary circuit, made up of the second current source 35 and third switch 36, and the third control line CL3 and second ground line GL2 in addition to the current source circuit 20 described in the first embodiment. In the present embodiment, the auxiliary circuit, made up of the second current source 35 and third switch 36, is provided so that the column current I flows even during the period 1 as described later.

The second current source 35 includes an N-type MOS transistor. The second current source 35 has its gate connected to the gate potential supply line SL, its drain connected to the source of the third switch 36 and its source connected to the ground line GL. The column current (saturation current) flowing from the second current source 35 to the second ground line GL2 is determined by the potential difference between the gate and source of the second current source 35.

The third switch 36 includes an N-type MOS transistor. The third switch 36 has its drain connected to the vertical signal line VL, its source connected to the drain of the second current source 35 and its gate connected to the third control line CL3. The current flowing from the vertical signal line VL to the second current source 35 is controlled by the ON/OFF operation of the third switch 36. It should be noted that the third switch 36 turns ON when the high level third control pulse s3 is applied to its gate.

It should be noted that although an example has been presented in FIG. 4 in which all the first current source 31, first and second switches 32 and 33, second current source 35 and third switch 36 include an N-type MOS transistor, the present disclosure is not limited thereto. The conductivity type (N- or P-type) of each of the MOS transistors and the combination thereof may be changed as appropriate.

In the present embodiment, on the other hand, it is only necessary to reduce the variation in current during switching from the period 1 to period 2 or vice versa. Therefore, the column current flowing via the second current source 35 during the period 1 may not be the same as that flowing via the first current source 31 during the period 2. For this reason, the second current source 35 may be configured differently from the first current source 31 (e.g., different channel sizes). Alternatively, the second and first ground lines GL2 and GL1 may be configured differently.

[Readout Operation of the Solid-State Imaging Device]

Figure 5:
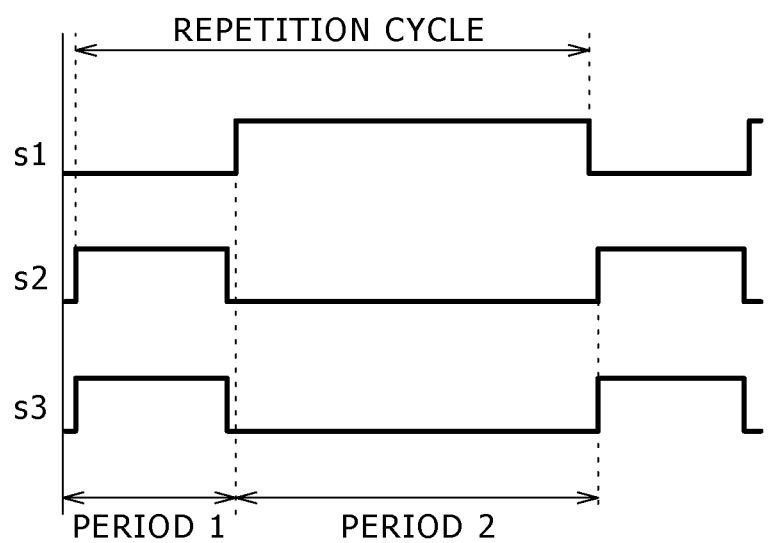
FIG. 5 is timing diagrams of the readout operation in the solid-state imaging element according to the second embodiment of the present disclosure.

A specific description will be given next of the readout operation of the solid-state imaging element 200 according to the present embodiment with reference to FIGS. 5 and 6A to 6C. FIG. 5 is timing diagrams of the first, second and third control pulses s1, s2 and s3 supplied to each of the current source circuits 30 during readout operation. It should be noted, however, that FIG. 5 illustrates the timing diagrams during a readout period for one row (single readout period), and the repetition cycle shown in FIG. 5 corresponds to the readout period for one row.

On the other hand, FIG. 6A is a potential distribution diagram illustrating the relationship between the column position on each ground line and the gate and source potentials of each of the current sources during the period 1 shown in FIG. 5. FIG. 6B is a potential distribution diagram illustrating the relationship between the column position on the first ground line GL1 and the gate and source potentials Vg and VSS of the first current source 31 during the period 2 shown in FIG. 5. It should be noted that the horizontal axis of the characteristic diagrams shown in FIGS. 6A and 6B represents the column position on the ground line, and the vertical axis thereof represents the potential. Further, FIG. 6C is a current distribution diagram illustrating the relationship between the column position on the first ground line GL1 and the column current I supplied from the first current source 31 to the first ground line GL1 during the period 2 shown in FIG. 5. The horizontal axis of the characteristic diagram shown in FIG. 6C represents the column position on the first ground line GL1, and the vertical axis thereof represents the current.

In the present embodiment, the readout period for one row is divided into the periods 1 and 2 as in the first embodiment so as to raise the gate potential Vg of the first current source 31 and/or hold the gate potential during the period 1 and read out the pixel signals during the period 2.

First, the current control circuit 5 supplies the low level first control pulse s1 to the first control line CL1 during the period 1. This turns OFF the first switch 32, thus interrupting the current flowing through the first current source 31. Further, the current control circuit 5 supplies the high level second control pulse s2 to the second control line CL2 during the period 1. This turns ON the second switch 33, thus charging the capacitive element 34 and raising the gate potential of the first current source 31 to the potential Vgate and/or holding the gate potential at this level.

The column current I does not flow from each of the current sources 31 to the first ground line GL1 during the period 1. Therefore, the source potential VSS of each of the first current sources 31 is constant irrespective of the column position on the first ground line GL1 as illustrated by a characteristic curve 201 in FIG. 6A. Further, the gate potential Vg of each of the first current sources 31 is constant at the potential Vgate during the period 1 irrespective of the column position on the first ground line GL1 as illustrated by a characteristic curve 202 in FIG. 6A. As a result, the potential difference Vgs between the gate and source of each of the first current sources 31 is constant irrespective of the column position on the first ground line GL1.

Further, the current control circuit 5 supplies the high level third control pulse s3 to the third control line CL3 during the period 1. This turns ON the third switch 36, thus allowing for a current to flow into the auxiliary circuit made up of the second current source 35 and third switch 36. At this time, the column current determined by the potential difference between the gate and source of the second current sources 35 flows from the auxiliary circuit into the second gland line GL2, thus resulting in IR drop in the second ground line GL2. As a result, the distribution of the source potential VSS_sub of the second current source 35 is in the form of an arch during the period 2 as illustrated by a characteristic curve 203 in FIG. 6A, with the source potential VSS_sub of the second current source 35 peaking near the column at the center of the second ground line GL2. That is, the source potential VSS_sub of the second current source 35 near the column at the center of the second ground line GL2 floats relative to the source potentials VSS at the columns at the ends of the second ground line GL2 during the period 1.

Next, when the period 2 begins following the period 1, the current control circuit 5 supplies the high level first control pulse s1 to the first control line CL1. This turns ON the first switch 32, allowing for a current to flow into the first current source 31. At this time, the column current I (saturation current) determined by the potential difference Vgs between the gate and source of the first current source 31 flows from the first current source 31 into the first gland line GL1.

Further, the current control circuit 5 supplies the low level second control pulse s2 to the second control line CL2 during the period 2. This turns OFF the second switch 33, causing the gate of the first current source 31 to float.

The column current I flows through the first ground line GL1 during the period 2 as described above, thus resulting in IR drop. As a result, the distribution of the source potential VSS of the first current source 31 is in the form of an arch during the period 2 as illustrated by a characteristic curve 204 in FIG. 6A, with the source potential VSS of the first current source 31 peaking near the column at the center of the first ground line GL1. That is, the source potential VSS of the first current source 31 near the column at the center of the first ground line GL1 floats relative to the source potentials VSS at the columns at the ends of the first ground line GL1 during the period 2.

It should be noted, however, that the gate of the first current source 31 floats during the period 2 and that the source and gate of the first current source 31 are coupled together via the capacitive element 34. In this condition, the gate potential Vg of the first current source 31 changes as much as the source potential VSS thereof in the same manner as the operating principle described in the first embodiment, thus cancelling out the impact of IR drop.

That is, the distribution of the gate potential Vg of the first current source 31 is in the form of an arch, with the gate potential Vg of the first current source 31 peaking near the column at the center of the first ground line GL during the period 2 as illustrated by a characteristic curve 205 (Vgate(S/H)) in FIG. 6B. As a result, the potential difference Vgs between the gate and source of the first current source 31 is constant irrespective of the column position during the period 2. This makes it possible for the current source circuit 30 according to the present embodiment to maintain constant the column current I flowing into the first ground line GL1 irrespective of the column position as illustrated by a characteristic curve 206 in FIG. 6C.

On the other hand, the current control circuit 5 supplies the low level third control pulse s3 to the third control line CL3 during the period 2. This turns OFF the third switch 36, thus interrupting the column current flowing through the auxiliary circuit made up of the second current source 35 and third switch 36. The present embodiment controls the operation of each of the current source circuits 30 as described above.

In the present embodiment, the column current I flows only from the first current source 31 to the first ground line GL1 during pixel signal readout (period 2) as described above. The column current I can be maintained constant irrespective of the column position on the first ground line GL1. Therefore, the present embodiment can also cancel out the impact of IR drop, thus providing the same advantageous effect as the first embodiment.

It should be noted that the current source circuit 30 according to the present embodiment is larger in layout size than the current source circuit 20 according to the first embodiment by the space for forming the auxiliary circuit made up of the second current source 35 and third switch 36, and the second ground line GL2 and the third control line CL3. However, the present embodiment eliminates the need to consider the impact of IR drop as does the first embodiment, thus providing, for example, a higher degree of freedom in designing the layout of the ground line GL (higher layout efficiency) than in the past. As a result, the present embodiment contributes to smaller chip size of the solid-state imaging element 200 as compared to the traditional reinforcement of the ground line GL.

Further, the column current I flows through the ground line also during the period 1 in the present embodiment, thus ensuring a smaller variation in current during switching from the period 1 to period 2 or vice versa. This makes it possible for the present embodiment to minimize problems including noise during switching from the period 1 to period 2 or vice versa and pulling-up of the potential of the vertical signal line VL.

It should be noted that although an example has been described in the present embodiment in which the second and third control lines CL2 and CL3 are provided separately, the present disclosure is not limited thereto. In the present embodiment, the second and third control pulses s2 and s3 are in phase as illustrated in FIG. 5. Therefore, a common control line may be used to serve as the second and third control lines CL2 and CL3.

On the other hand, IR drop occurs in the second ground line GL2 during the period 1 in the present embodiment, thus resulting in inconstant distribution of the column current. In order to minimize the variation in current in the second ground line GL2, the channel size (width or length) of the second current source 35, for example, may be different from one column to another to cancel out the impact of IR drop.

More specifically, in the example shown in FIG. 4, a channel width W of each of the second current sources 35 is expanded or a channel length L thereof is shortened gradually from both ends of the second ground line GL2 toward the center thereof. Changing the channel size of each of the second current sources 35 increases the column current near the center of the second ground line GL2, thus cancelling out the impact of IR drop. It should be noted that this IR drop cancellation technique offers lower cancellation accuracy than the IR drop cancellation technique according to the present disclosure applied to the first ground line GL (main line). However, IR drop occurs in the second ground line GL2 during the period 1 in which the pixel signals are not read out. Therefore, it is not necessary to cancel the IR drop with high accuracy.

3. Third Embodiment

In the first and second embodiments, cases have been described in which a sample-and-hold period (period 1), i.e., a period in which the pixel signals are not read out, is provided prior to the pixel signal readout period (period 2). However, the present disclosure is not limited thereto. A description will be given here of a configuration example in which no readout-free period is provided.

[Overall Configuration of the Solid-State Imaging Device]

Figure 7:
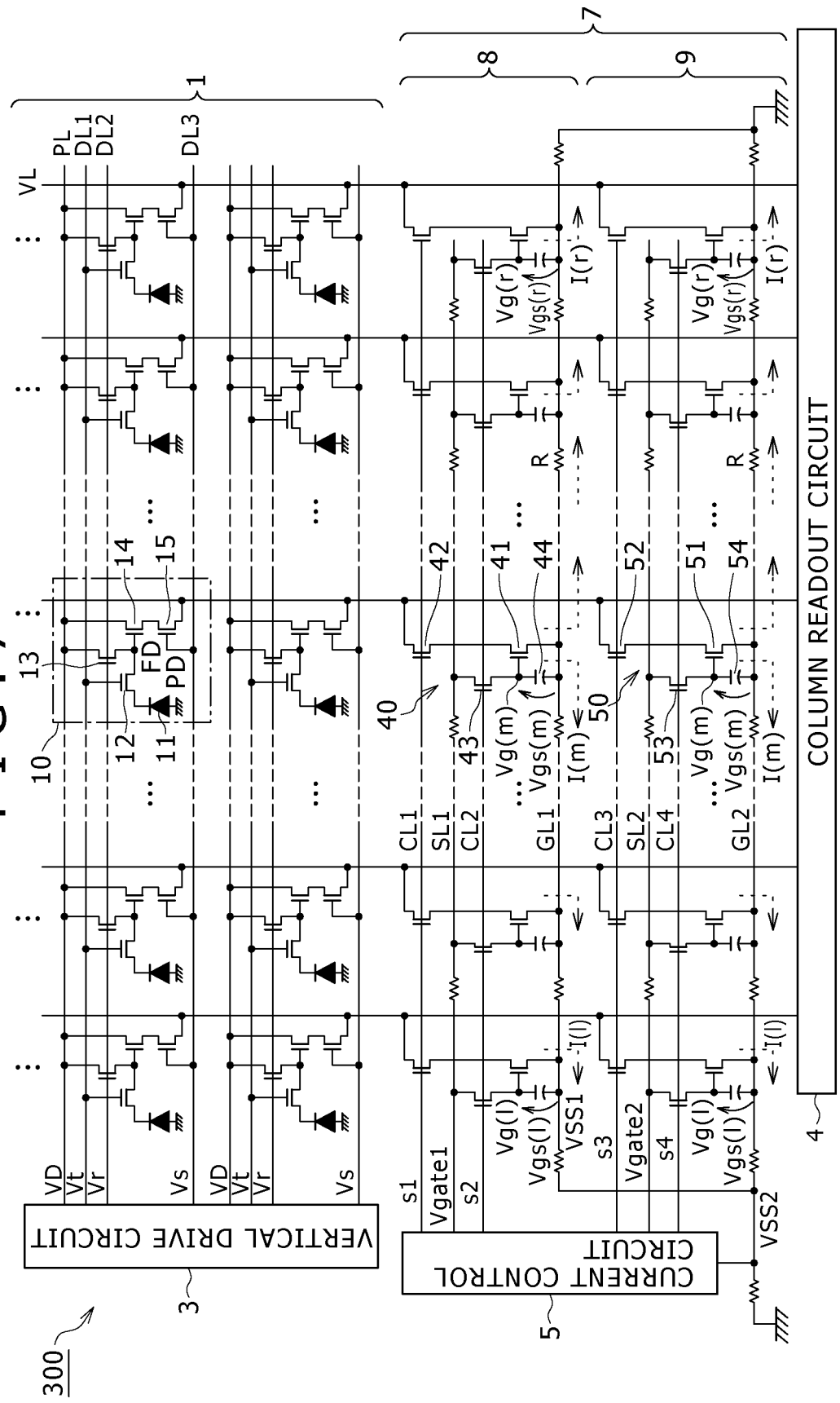
FIG. 7 is a schematic configuration diagram of the solid-state imaging element according to a third embodiment of the present disclosure.

FIG. 7 illustrates the schematic configuration of the solid-state imaging element according to the third embodiment. It should be noted that the components of a solid-state imaging element 300 according to the present embodiment shown in FIG. 7 identical to those of the solid-state imaging element 200 according to the second embodiment shown in FIG. 4 are denoted by the same reference numerals.

The solid-state imaging element 300 includes the pixel array section 1, a current source circuit section 7, the vertical drive circuit 3, column readout circuit 4 and current control circuit 5. These sections are formed on the same semiconductor substrate (chip) which is not shown. The solid-state imaging element 300 is configured in the same manner as its counterpart according to the first embodiment except for the current source circuit section 7. Therefore, the configuration of only the current source circuit section 7 will be described here.

The current source circuit section 7 includes first and second current source circuit sections 8 and 9. The first current source circuit section 8 includes a plurality of first current source circuits 40 that are provided one for each of the vertical signal lines VL. On the other hand, the second current source circuit section 9 includes a plurality of second current source circuits 50 that are provided one for each of the vertical signal lines VL.

[Configuration of the Current Source Circuits]

Each of the current source circuits 40 in the first current source circuit section 8 includes a first current source 41, first and second switches 42 and 43 and first capacitive element 44. Further, a first gate potential supply line SL1 and the first ground line GL1 are provided in common for the current source circuits 40. The first gate potential supply line SL1 supplies the gate potential Vgate to the first current source 41. The first ground line GL1 supplies a source potential VSS1 to the first current source 41. It should be noted that both ends of the first ground line GL1 are grounded. Further, the first and second control lines CL1 and CL2 are provided in common for the current source circuits 40. The first control line CL1 supplies the first control pulse s1 to the first switch 42. The second control line CL2 supplies the second control pulse s2 to the second switch 43.

It should be noted that the first current source 41, first and second switches 42 and 43 and first capacitive element 44 in each of the current source circuits 40 according to the present embodiment are configured in the same manner as their counterparts in each of the current source circuits 20 according to the first embodiment, i.e., the current source 21, first and second switches 22 and 23 and capacitive element 24. Further, the first gate potential supply line SL1, first ground line GL1 and first and second control lines CL1 and CL2 according to the present embodiment are also configured in the same manner as their counterparts according to the first embodiment, i.e., the gate potential supply line SL, ground line GL and first and second control lines CL1 and CL2.

On the other hand, each of the second current source circuits 50 in the second current source circuit section 9 includes a second current source 51, third and fourth switches 52 and 53 and second capacitive element 54. Further, a second gate potential supply lines SL2 and the second ground line GL2 are provided in common for the second current source circuits 50. The second gate potential supply line SL2 supplies the gate potential Vgate to the second current source 51. The second ground line GL2 supplies a source potential VSS2 to the second current source 51. It should be noted that the second ground line GL2 is arranged in parallel with the first ground line GL1 with both ends of the second ground line GL2 grounded. Further, the third control line CL3 and a fourth control line CL4 are provided in common for the second current source circuits 50. The third control line CL3 supplies the third control pulse s3 to the third switch 52. The fourth control line CL4 supplies a fourth control pulse s4 to the fourth switch 53.

Still further, the first and second current source circuits 40 and 50 are configured in the same manner in the present embodiment. That is, in the present embodiment, the first and second current source circuits 40 and 50 configured in the same manner are provided in parallel between the vertical signal line VL and ground (grounding point).

It should be noted that although an example has been presented in FIG. 7 in which the current sources and switches of all the current source circuits include an N-type MOS transistor, the present disclosure is not limited thereto. The conductivity type (N- or P-type) of each of the MOS transistors and the combination thereof may be changed as appropriate.

[Readout Operation of the Solid-State Imaging Device]

A specific description will be given next of the readout operation of the solid-state imaging element 300 according to the present embodiment with reference to FIGS. 8 and 9A to 9C. FIG. 8 is timing diagrams of the first and second control pulses s1 and s2 supplied to each of the first current source circuits 40 during readout operation and the third and fourth control pulses s3 and s4 supplied to each of the second current source circuits 50 during readout operation. It should be noted, however, that the repetition cycle shown in FIG. 8 corresponds to the readout period for two rows and the period in which the column readout circuit repeats the operation in FIG. 8 corresponds to the readout period for one row.

On the other hand, FIG. 9A is a potential distribution diagram illustrating the relationship between the column position on each ground line and the gate and source potentials of each of the current sources during the period 1 shown in FIG. 8. FIG. 9B is a potential distribution diagram illustrating the relationship between the column position on each ground line and the gate and source potentials of each of the current sources during the period 2 shown in FIG. 8. It should be noted that the horizontal axis of the characteristic diagrams shown in FIGS. 9A and 9B represents the column position on the ground line, and the vertical axis thereof represents the potential. Further, FIG. 9C is a current distribution diagram illustrating the relationship between the column position on each ground line and the column current supplied to each ground line during the periods 1 and 2 shown in FIG. 8. It should be noted that the horizontal axis of the characteristic diagram shown in FIG. 9C represents the column position on each ground line, and the vertical axis thereof represents the current level.

It should be noted that, in the present embodiment, the pixel signals are read out by causing the column current I to flow into the second ground line GL2 via the second current source circuits 50 during one of the readout periods for one row (period 1) as described later. Further, the pixel signals are read out by causing the column current I to flow into the first ground line GL1 via the first current source circuits 40 during the other readout period for one row (period 2).

First, the current control circuit 5 supplies the low level first control pulse s1 to the first control line CL1 during the period 1. This turns OFF the first switch 42 of the first current source circuit 40, thus interrupting the current flowing through the first current source 41. Further, the current control circuit 5 supplies the high level second control pulse s2 to the second control line CL2 during the period 1. This turns ON the second switch 43 of the first current source circuit 40, thus charging the capacitive element 44 and raising the gate potential Vg of the first current source 41 to the potential Vgate and/or holding the gate potential at this level.

The column current I does not flow from each of the first current sources 41 to the first ground line GL1 during the period 1. Therefore, the source potential VSS1 of each of the first current sources 41 is constant irrespective of the column position on the first ground line GL1 as illustrated by a characteristic curve 301 in FIG. 9A. Further, the gate potential Vg of each of the first current sources 41 is constant at the potential Vgate during the period 1 irrespective of the column position on the first ground line GL1 as illustrated by a characteristic curve 302 (Vgate1) in FIG. 9A. As a result, the potential difference Vgs between the gate and source of each of the first current sources 41 is constant irrespective of the column position on the first ground line GL1.

Further, the current control circuit 5 supplies the high level third control pulse s3 to the third control line CL3 during the period 1. This turns ON the third switch 52 of the second current source circuit 50, allowing for a current to flow into the second current source 51. At this time, the column current I determined by the potential difference Vgs between the gate and source of the second current source 51 flows from the second current source 51 into the second gland line GL2, thus resulting in IR drop in the second ground line GL2. As a result, the distribution of the source potential VSS2 of the second current source 51 is in the form of an arch during the period 1 as illustrated by a characteristic curve 303 in FIG. 9A, with the source potential VSS2 of the second current source 51 peaking near the column at the center of the second ground line GL2. That is, the source potential VSS2 of the second current source 51 near the column at the center of the ground line GL2 floats relative to the source potentials VSS2 at the columns at the ends of the second ground line GL2 during the period 1.

Further, the current control circuit 5 supplies the low level fourth control pulse s4 to the fourth control line CL4 during the period 1. This turns OFF the fourth switch 53 of the second current source circuit 50, causing the gate of the second current source 51 to float. As a result, the gate potential Vg of the second current source 51 changes as much as the source potential VSS2 thereof in the same manner as the operating principle described in the first embodiment, thus cancelling out the impact of IR drop.

More specifically, the distribution of the gate potential Vg of the second current source 51 is in the form of an arch during the period 1 as with the distribution of the source potential VSS2 of the second current source 51 as illustrated by a characteristic curve 304 (Vgate2(S/H)) in FIG. 9A. That is, the gate potential Vg of the second current source 51 peaks near the column at the center of the second ground line GL2, making the distribution of the potential difference Vgs between the gate and source of the second current source 51 constant irrespective of the column position. This makes it possible for the present embodiment to maintain constant the column current I flowing into the second ground line GL2 irrespective of the column position during the period 1 as illustrated by a characteristic curve 309 in FIG. 9C.

Next, when the period 2 begins following the period 1, the current control circuit 5 supplies the high level first control pulse s1 to the first control line CL1. This turns ON the first switch 42, allowing for a current to flow into the first current source 41. At this time, the column current I determined by the potential difference Vgs between the gate and source of the first current source 41 flows from the first current source 41 into the first gland line GL1, thus resulting in IR drop in the first ground line GL1. As a result, the distribution of the source potential VSS1 of the first current source 41 is in the form of an arch during the period 2 as illustrated by a characteristic curve 305 in FIG. 9B, with the source potential VSS1 of the first current source 41 peaking near the column at the center of the first ground line GL1. That is, the source potential VSS1 of the first current source 41 near the column at the center of the first ground line GL1 floats relative to the source potentials VSS1 at the columns at the ends of the first ground line GL1 during the period 2.

Further, the current control circuit 5 supplies the low level second control pulse s2 to the second control line CL2 during the period 2. This turns OFF the second switch 43 of the first current source circuit 40, causing the gate of the first current source 41 to float. As a result, the gate potential Vg of the first current source 41 changes as much as the source potential VSS1 thereof in the same manner as the operating principle described in the first embodiment, thus cancelling out the impact of IR drop.

More specifically, the distribution of the gate potential Vg of the first current source 41 is in the form of an arch during the period 2 as with the distribution of the source potential VSS1 of the first current source 41 as illustrated by a characteristic curve 306 (Vgate1(S/H)) in FIG. 9B. That is, the gate potential Vg of the first current source 41 peaks near the column at the center of the first ground line GL1, making the distribution of the potential difference Vgs between the gate and source of the first current source 41 constant irrespective of the column position. This makes it possible for the present embodiment to maintain constant the column current I flowing into the first ground line GL1 irrespective of the column position during the period 2 as illustrated by the characteristic curve 309 in FIG. 9C.

Further, the current control circuit 5 supplies the low level third control pulse s3 to the third control line CL3 during the period 2. This turns OFF the third switch 52 of the second current source circuit 50, thus interrupting the current flowing through the second current source 51. Still further, the current control circuit 5 supplies the high level fourth control pulse s4 to the fourth control line CL4 during the period 2. This turns ON the fourth switch 53 of the second current source circuit 50, thus charging the second capacitive element 54 and raising the gate potential Vg of the second current source 51 to the potential Vgate and/or holding the gate potential at this level.

Still further, the column current I does not flow from each of the second current sources 51 to the second ground line GL2 during the period 2. Therefore, the source potential VSS2 of each of the second current sources 51 is constant irrespective of the column position on the second ground line GL2 as illustrated by a characteristic curve 307 in FIG. 9B. Still further, the gate potential Vg of each of the second current sources 51 is constant at the potential Vgate during the period 2 irrespective of the column position on the second ground line GL2 as illustrated by a characteristic curve 308 (Vgate2) in FIG. 9B. As a result, the potential difference Vgs between the gate and source of each of the second current sources 51 is constant irrespective of the column position on the second ground line GL2. The present embodiment controls the operation of each of the current source circuits as described above.

The current source circuit section 7 according to the present embodiment can maintain the column current I constant irrespective of the column position of the current source circuit and whether during the period 1 or 2 as described above. Therefore, the present embodiment can also cancel out the impact of IR drop, thus providing the same advantageous effect as the first embodiment.

It should be noted that the solid-state imaging element 300 according to the present embodiment is larger in layout size than its counterpart according to the first embodiment because two power supply circuits are provided for each column in the current source circuit 30 according to the present embodiment unlike the current source circuit section 2 according to the first embodiment. However, the present embodiment eliminates the need to consider the impact of IR drop as does the first embodiment, thus providing, for example, a higher degree of freedom in designing the layout of the ground line GL (higher layout efficiency) than in the past. As a result, the present embodiment contributes to smaller chip size of the solid-state imaging element 300 as compared to the traditional reinforcement of the ground line.

Further, just as the second embodiment has no column current interruption period, so the present embodiment has no column current interruption period. This makes it possible for the present embodiment to minimize problems including noise during switching from the period 1 to period 2 or vice versa and pulling-up of the potential of the vertical signal line VL.

Still further, the first and second current source circuits 40 and 50 operate in a complementary manner during the periods 1 and 2 in the present embodiment, thus securing a period of time for sampling and holding the gate potential Vg of each of the current sources while performing the readout operation at all times.

It should be noted that although an example has been described in the present embodiment in which the first to fourth control lines CL1 to CL4 are provided separately, the present disclosure is not limited thereto. In the present embodiment, the first and fourth control pulses s1 and s4 are in phase, and the second and third control pulses s2 and s3 are in phase as illustrated in FIG. 8. Therefore, a common control line may be used to serve as the first and fourth control lines CL1 and CL4, and another common control line may be used to serve as the second and third control lines CL2 and CL3.

Further, an example has been described in the present embodiment in which the first and second gate potential supply lines SL1 and SL2 adapted respectively to supply the gate potential Vgate to the first and second current sources 41 and 51 are provided separately, the present disclosure is not limited thereto. A common gate potential supply line may be used to serve as the first and second gate potential supply lines SL1 and SL2.

4. Various Modification Examples

The configuration of the current source circuit section in the solid-state imaging device according to the present disclosure is not limited to the examples described in the first to third embodiments, but may be modified in various ways. For example, the configuration thereof can be modified, for example, in the following manners.

(1) Modification Example 1

Although examples have been described in relation to the current source circuit sections according to the first to third embodiments in which the source potential VSS of the current sources is supplied from both ends of the ground line GL, the present disclosure is not limited thereto. Alternatively, the source potential VSS of the current sources may be supplied from one end of the ground line GL. It should be noted, however, that it is preferred in this case that the source potential VSS should be supplied from the end of the ground line GL on the side where the current control circuit 5 is provided.

It should be noted in this case that the distribution of the source potential VSS of the current sources over the ground line GL is not in the form of an arch illustrated by the characteristic curve 103 in FIG. 3B. Instead, the distribution thereof is such that the potential increases linearly from one end on the potential supply side to the other end on the opposite side. The current source circuit section according to the present disclosure is also applicable to this case and provides the same advantageous effect. Further, there is no need to ground both ends of the ground line GL in this case, thus providing further improved layout efficiency.

(2) Modification Example 2

Although examples have been described in relation to the current source circuit sections according to the first to third embodiments in which a full potential is supplied to the gate of the switch, provided on the drain side of the current source to interrupt the column current, to turn ON the switch, the present disclosure is not limited thereto. Alternatively, an intermediate potential may be supplied to the gate of the switch provided on the drain side of the current source so that the switch acts as a cascode. This makes it possible to supply a more accurate column current (constant current) to the ground line.

(3) Modification Example 3

Although examples have been described in the first to third embodiments in which the current source circuit section according to the present disclosure is applied to a source follower circuit made up of the amplifying transistor in the pixel and the current source in the current source circuit, the present disclosure is not limited thereto. The current source circuit section according to the present disclosure is applicable to an arbitrary circuit that has a current source for each column or for each of the vertical signal lines VL. For example, the current source circuit section according to the present disclosure is applicable to the current source supply section of the comparator included in the column ADC (Analog to Digital Converter) provided for each column in the column readout circuit 4, thus providing the same advantageous effect.

5. Fourth Embodiment

Configuration Example of the Imaging Device

A description will be given next of electronic equipment having the solid-state imaging element according to the present disclosure. An example will be described here in which the solid-state imaging element according to the present disclosure is applied to an imaging device such as camera module incorporated in a mobile device such as video camcorder, digital still camera or mobile phone.

FIG. 10 schematically illustrates the block configuration of an imaging device having the solid-state imaging element according to the present disclosure. An imaging device 400 includes an optics 401, imaging element 402, signal processing circuit 403, frame memory 404, display section 405, storage section 406, operation section 407 and power supply section 408. The signal processing circuit 403, frame memory 404, display section 405, storage section 406, operation section 407 and power supply section 408 are connected to each other via a bus line 409.

The optics 401 includes a plurality of lenses to capture incident light (image light) from the subject and form an image on the imaging surface (not shown) of the imaging element 402.

The imaging element 402 converts the intensity of incident light, whose image is formed on the imaging surface by the optics 401, into an electric signal on a pixel-by-pixel basis and outputs the electric signal as a pixel signal. The imaging element 402 includes, for example, one of the varieties of solid-state imaging elements described in the embodiments and modification examples.

The signal processing circuit 403 may include, for example, a DSP (Digital Signal Processor) and processes the pixel signal output from the imaging element 402 in a variety of ways. The display section 405 includes a panel display device such as liquid crystal display device or organic EL (electro luminescence) display device to display a captured moving or still image. On the other hand, the storage section 406 stores the moving or still image captured by the imaging element 402 in a storage medium such as HDD (Hard Disk Drive), semiconductor memory or optical disk.

The operation section 407 outputs an appropriate instruction signal when the user performs a predetermined operation of the imaging device 400. The power supply section 408 supplies operating power to the signal processing circuit 403, frame memory 404, display section 405, storage section 406 and operation section 407.

The imaging device 400 described above includes the solid-state imaging element according to the present disclosure, making it possible for the same device 400 to resolve the problem of IR drop and provide a more compact imaging device with lower power consumption.

The present disclosure contains subject matter related to that disclosed in Japanese Priority Patent Application JP 2010-142679 filed in the Japan Patent Office on Jun. 23, 2010, the entire content of which is hereby incorporated by reference.

It should be understood by those skilled in the art that various modifications, combinations, sub-combinations and alterations may occur depending on design requirements and other factors in so far as they are within the scope of the appended claims or the equivalents thereof.

What is claimed is:

1. An imaging element comprising:
a pixel array section having a plurality of pixels arranged in a matrix form along the row and column directions and a plurality of readout signal lines adapted to read out pixel signals from the plurality of pixels;
a first current source including a MOS transistor and provided for each of the readout signal lines;
a first ground line supplied with a current generated by the first current source;
a first switch provided between the drain of the first current source and the associated readout signal line to turn ON and OFF the current flowing through the first current source;
a first capacitive element provided between the gate and source of the first current source to raise the gate potential of the first current source to a predetermined level and/or hold the gate potential at this level, wherein the first capacitive element is directly connected to the first ground line;
a second switch adapted to start and stop the charging of the first capacitive element; and
a current control circuit adapted to switch OFF the first switch and switch ON the second switch during a first period in which the first capacitive element is charged, and switch ON the first switch and switch OFF the second switch during a second period in which the pixel signals are read out.

2. The imaging element of claim 1, wherein each of the first current source, first switch and second switch includes an N-type MOS transistor,
the current control circuit supplies a first control signal to the gate of the first switch, the first control signal being at low level during the first period and at high level during the second period, and
the current control circuit supplies a second control signal to the gate of the second switch, the second control signal being at high level during the first period and at low level during the second period.

3. The imaging element of claim 2 further comprising:
a readout circuit adapted to read out the pixel signals via the plurality of readout signal lines.

4. The imaging element of claim 1 further comprising:
a second current source including a MOS transistor and provided for each of the readout signal lines;
a second ground line supplied with a current generated by the second current source; and
a third switch provided between the drain of the second current source and the associated readout signal line and controlled to turn ON during the first period and turn OFF during the second period by the current control circuit.

5. An imaging element comprising:
a pixel array section having a plurality of pixels arranged in a matrix form along the row and column directions and a plurality of readout signal lines adapted to read out pixel signals from the plurality of pixels;
a first current source including a MOS transistor and provided for each of the readout signal lines;
a first ground line supplied with a current generated by the first current source;
a first switch provided between the drain of the first current source and the associated readout signal line to turn ON and OFF the current flowing through the first current source;
a first capacitive element provided between the gate and source of the first current source to raise the gate potential of the first current source to a predetermined level and/or hold the gate potential at this level;
a second switch adapted to start and stop the charging of the first capacitive element; and
a current control circuit adapted to switch OFF the first switch and switch ON the second switch during a first period in which the first capacitive element is charged, and switch ON the first switch and switch OFF the second switch during a second period in which the pixel signals are read out;
a second current source including a MOS transistor and provided for each of the readout signal lines;
a second ground line supplied with a current generated by the second current source;
a third switch provided between the drain of the second current source and the associated readout signal line and controlled to turn ON during the first period and turn OFF during the second period by the current control circuit;
a second capacitive element provided between the gate and source of the second current source to raise the gate potential of the second current source to a predetermined level and/or hold the gate potential at this level; and
a fourth switch controlled to turn OFF during the first period and turn ON during the second period by the current control circuit so as to start and stop the charging of the second capacitive element.

6. An imaging device comprising:
a pixel array section having a plurality of pixels arranged in a matrix form along the row and column directions and a plurality of readout signal lines adapted to read out pixel signals from the plurality of pixels;
an optics adapted to capture subject light and form an image on the imaging surface of the pixel array section;
a first current source including a MOS transistor and provided for each of the readout signal lines;
a first ground line supplied with a current generated by the first current source;
a first switch provided between the drain of the first current source and the associated readout signal line to turn ON and OFF the current flowing through the first current source;
a first capacitive element provided between the gate and source of the first current source to raise the gate potential of the first current source to a predetermined level and/or hold the gate potential at this level, wherein the first capacitive element is directly connected to the first ground line;
a second switch adapted to start and stop the charging of the first capacitive element; and
a current control circuit adapted to switch OFF the first switch and switch ON the second switch during a first period in which the first capacitive element is charged, and switch ON the first switch and switch OFF the second switch during a second period in which the pixel signals are read out.

* * * * *